(12) United States Patent
Learmonth (10) Patent No.: US 11,809,538 B2
(45) Date of Patent: *Nov. 7, 2023

(54) FACIAL AUTHENTICATION SYSTEM (71) Applicant: Nortek Security & Control LLC, Carlsbad, CA (US)

(72) Inventor: Darren Learmonth, Austin, TX (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,685

(22) Filed: Jun. 21, 2022

(65) Prior Publication Data

US 2022/0318360 A1    Oct. 6, 2022

Related U.S. Application Data (63) Continuation of application No. 17/009,280, filed on Sep. 1, 2020, now Pat. No. 11,416,595.

(51) Int. Cl.
*G06F 21/32* (2013.01)
*H04L 9/40* (2022.01)
*G06V 10/141* (2022.01)
*G06V 40/30* (2022.01)
(Continued)

(52) U.S. Cl.
CPC ............ *G06F 21/32* (2013.01); *G06V 10/141* (2022.01); *G06V 40/161* (2022.01); *G06V 40/172* (2022.01); *G06V 40/33* (2022.01); *G06V 40/70* (2022.01); *H04L 63/0861* (2013.01)

(58) Field of Classification Search
CPC .... G06F 21/32; G06V 10/141; G06V 40/161; G06V 40/172; G06V 40/33; G06V 40/70; H04L 63/0861
See application file for complete search history.

(56) References Cited

U.S. PATENT DOCUMENTS

| 6,490,367 | B1 | 12/2002 | Carlsson et al. |
| 10,984,225 | B1 | 4/2021 | Ghosh et al. |
| 11,416,595 | B2* | 8/2022 | Learmonth .......... G06V 40/172 |

(Continued)

FOREIGN PATENT DOCUMENTS

| CN | 111444894 A | 7/2020 |
| WO | WO-2022051300 A1 | 3/2022 |

OTHER PUBLICATIONS

"U.S. Appl. No. 17/009,280, Non Final Office Action dated Mar. 18, 2022", 10 pgs.

(Continued)

*Primary Examiner* — John B Strege
(74) *Attorney, Agent, or Firm* — Schwegman Lundberg & Woessner, P.A.

(57) ABSTRACT

An authentication system accesses an image of a face of a user. The face of the user is partially covered by a facial mask. The authentication system detects an area on the facial mask and generates a first identification of the user based on the area on the facial mask. The authentication system also detects an exposed area uncovered by the facial mask on the face of the user and generates a second identification of the user based on the exposed area. The authentication system compares the first identification of the user with the second identification of the user, and authenticates the user based on the comparison.

20 Claims, 8 Drawing Sheets (51) Int. Cl.
*G06V 40/70* (2022.01)
*G06V 40/16* (2022.01)

(56) References Cited

U.S. PATENT DOCUMENTS

| | | |
|---|---|---|
| 2006/0212996 A1 | 9/2006 | Mcgrath |
| 2007/0036398 A1 | 2/2007 | Chen |
| 2007/0122005 A1 | 5/2007 | Kage et al. |
| 2007/0199567 A1 | 8/2007 | Kanzer |
| 2013/0163829 A1 | 6/2013 | Kim et al. |
| 2014/0270404 A1 | 9/2014 | Hanna et al. |
| 2019/0050632 A1 | 2/2019 | Weng et al. |
| 2021/0345694 A1 | 11/2021 | Volk et al. |
| 2021/0358244 A1* | 11/2021 | Chafni ................ G06F 21/602 |
| 2022/0044007 A1 | 2/2022 | Saleh |
| 2022/0057829 A1 | 2/2022 | Schreiner |
| 2022/0067132 A1 | 3/2022 | Learmonth |

OTHER PUBLICATIONS

"U.S. Appl. No. 17/009,280, Notice of Allowance dated Apr. 13, 2022", 5 pgs.

"U.S. Appl. No. 17/009,280, Response filed Mar. 29, 2022 to Non Final Office Action dated Mar. 18, 2022", 11 pgs.

"International Application Serial No. PCT/US2021/048531, International Search Report dated Nov. 30, 2021", 2 pgs.

"International Application Serial No. PCT/US2021/048531, Written Opinion dated Nov. 30, 2021", 4 pgs.

Anwar, et al., "Masked Face Recognition for Secure Authentication", arXiv:2008.11104v1 [cs.CV], Retrieved on Oct. 31, 2021, retrieved from <URL:https://arxiv.Org/pdf/2008.11104.pdf> entire document, (Aug. 25, 2020), 8 pages.

Hariri, Walid, "Efficient Masked Face Recognition Method during the COVID-19 Pandemic", arXiv:2105.03026v1 [cs.CV], Retrieved on Oct. 30, 2021. Retrieved from <URL:https://arxiv.org/pdf/2105.03026.pdf> entire document, (May 7, 2021), 8 pages.

Metz, "Think your mask makes you invisible to facial recognition? Not so fast, AI companies say", [Online]. Retrieved from the Internet: <https://www.cnn.com/2020/08/12/tech/face-recognition-masks/index.html>, (Aug. 12, 2020.), 5 pages.

U.S. Appl. No. 17/009,280, filed Sep. 1, 2020, Facial Authentication System.

"International Application Serial No. PCT/US2021/048531, International Preliminary Report on Patentability dated Mar. 16, 2023", 6 pgs.

* cited by examiner

FACIAL AUTHENTICATION SYSTEM

CLAIM OF PRIORITY

This application is a continuation of U.S. patent application Ser. No. 17/009,280, filed Sep. 1, 2020, which is hereby incorporated by reference herein in its entirety.

TECHNICAL FIELD

The present application generally relates to the field of authentication system, and in particular, relates to methods and systems for user authentication using facial recognition.

BACKGROUND

Traditional facial recognition software typically relies on capturing a substantial portion of a face of a person. As such, when the person covers a portion of their face with a face mask, the facial recognition software may not properly operate. Other types of biometric authentication software rely on a limited uncovered portion of the face such as the eyes. However, in such situation, a user who wears glasses will need to remove his/her glasses and move his eyes closer to a camera. In other situation, the face mask may cover different parts of the face, making difficult for the biometric authentication software to properly operate.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example methods and systems are directed to multiple camera calibration in a distributed camera system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A camera of a computing device captures an image of a face of a user for authentication. For example, the user is attempted to access physical entry into a physical location or access application features of a computer application. The user is wearing a facial mask that partially obstructs a portion of the face of the user. For example, a portion of the mouth and nose of the user is partially obstructed by the facial mask. An authentication system processes the image to authenticate the user by identifying a first portion of the image and a second portion of the image.

The first portion of the image includes an image of the facial mask. For example, the image of the facial mask includes a written signature displayed on the facial mask. In another example, the image of the facial mask includes a graphical content (e.g., QR code, geometric pattern, unique image) that is uniquely associated with a user identifier. In another example, the graphical content on the image can only be viewed when illuminated with a light source from a non-human visible light spectrum. The authentication system accesses a signature library that maps users with their corresponding signatures. The authentication system then determines a first identification of the user based on the signature on the facial mask and the signature library.

The second portion of the image includes an image of the exposed areas of the face of the user. For example, the exposed area includes the eyes of the user. The authentication system performs biometric measurements (e.g., relative distance and location between features of the eyes or eyebrows) the exposed area to determine biometrics data. The authentication system determines a second identification of the user based on the biometrics data.

The authentication system compares the first identification of the user with the second identification of the user to authenticate the user. For example, if the first and second identification of the user are the same, the user is validated and the user is allowed access. If the first and second identification of the user are different, the system may deny access or may request the user to take off his/her facial mask, or to present another exposed area of the face of the user.

In one example embodiment, the present application describes an authentication system based on a partially exposed face of a user. The authentication system accesses an image of a face of a user. The face of the user is partially covered by a facial mask. The authentication system detects an area on the facial mask and generates a first identification of the user based on the area on the facial mask. The authentication system also detects an exposed area uncovered by the facial mask on the face of the user and generates a second identification of the user based on the exposed area. The authentication system compares the first identification of the user with the second identification of the user, and authenticates the user based on the comparison.

Figure 1:
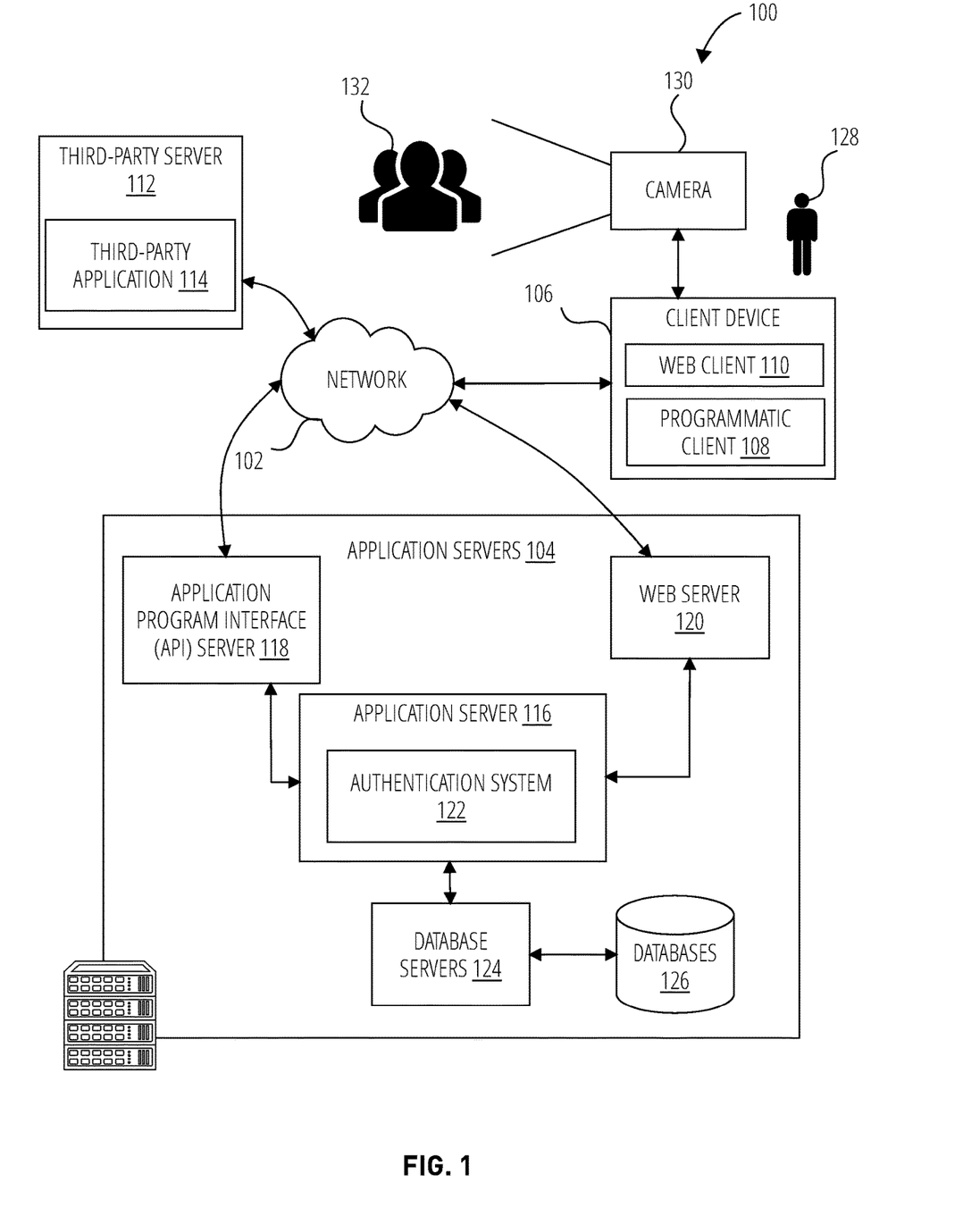
FIG. 1 is a diagrammatic representation of a networked environment in which the present disclosure may be deployed, in accordance with some example embodiments.

FIG. 1 is a diagrammatic representation of a network environment 100 in which some example embodiments of the present disclosure may be implemented or deployed. One or more application servers 104 provide server-side functionality via a network 102 to a networked user device (in the form of a client device 106 of the user 128) connected to a camera 130. A web client 110 (e.g., a browser) and a programmatic client 108 (e.g., an "app") are hosted and execute on the client device 106. The client device 106 can communicate with the application servers 104 via the network 102 or via other wireless or wired means.

The camera 130 includes a camera that operates within a light spectrum visible to the human eye. In another example, the camera operates outside the human-visible light spectrum. In one example, the camera 130 is configured capture an image of a face of a user 132.

An Application Program Interface (API) server 118 and a web server 120 provide respective programmatic and web interfaces to application servers 104. A specific application server 116 hosts an authentication system 122 that operates with the application server 116.

In one example embodiment, the authentication system 122 receives a video/image from the camera 130. The authentication system 122 identifies two portions of the image: a first portion that includes the facial mask, and a second portion that includes an exposed area of the face of the user 132. The authentication system 122 determines a first user identification based on the first portion and a second user identification based on the second portion. The first and second user identification are compared to authenticate the user 132.

The operations performed by the authentication system 122 may be also performed or distributed to another server such as a third-party server 112. For example, the first or second user identification may be determined at the third-party server 112.

In another example embodiment, the camera 130 includes a processor and a memory. The memory of the camera 130 stores the authentication system 122. The processor of the camera 130 is configured to perform operations/computations of the algorithms described further below with respect to FIG. 4 of the authentication system 122. As such, in one embodiment, the camera 130 can be a standalone device that is capable of authenticating user 132 without having to connect with the application servers 104 to identify the first or second user identification.

In another example embodiment, the computation of the algorithms described in authentication system 122 can be distributed across multiple devices. For example, the portion of the computation that determines the first user identification can be performed locally at the camera 130 or the client device 106. The portion of the computation that determines the second user identification can be performed at the application server 116 or at the third-party server 112. In yet another example, the portion of the computation that determines the first user identification can be performed at the third-party application 114 and the portion that determines the second user identification can be performed at the application server 116.

The web client 110 communicates with the authentication system 122 via the web interface supported by the web server 120. Similarly, the programmatic client 108 communicates with the authentication system 122 via the programmatic interface provided by the Application Program Interface (API) server 118. The third-party application 114 may, for example, be another application to support the authentication system 122 or mine the data from the authentication system 122. For example, the third-party application 114 may access image/video data from the camera 130. The application server 116 is shown to be communicatively coupled to database servers 124 that facilitates access to an information storage repository or databases 126 (e.g., user identification library, user biometrics library, user signature library). In an example embodiment, the databases 126 includes storage devices that store information to be published and/or processed by the authentication system 122.

Figure 2:
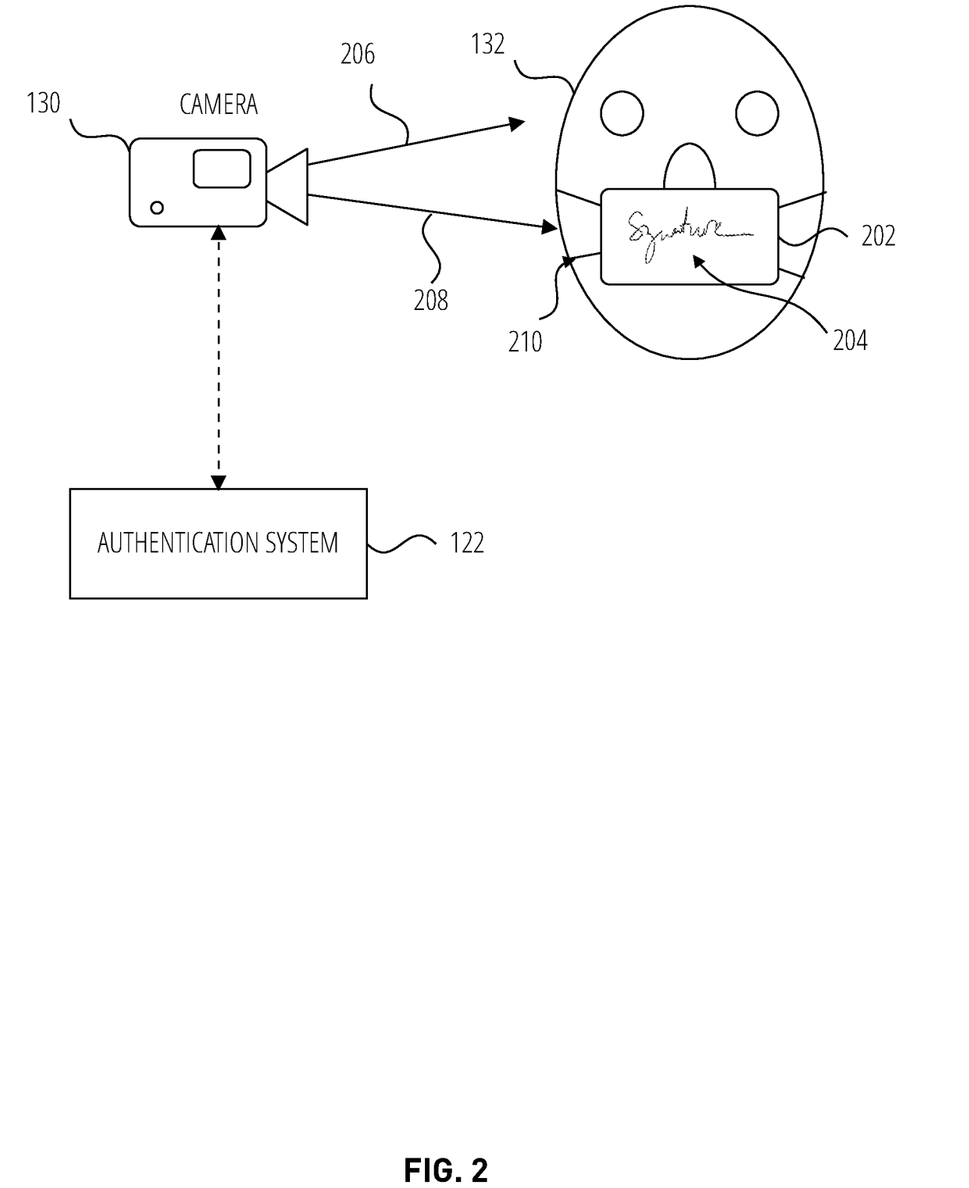
FIG. 2 illustrates an example operation of the authentication system in accordance with one example embodiment.

FIG. 2 illustrates an example operation of the authentication system in accordance with one example embodiment.

The authentication system 122 is connected (directly or indirectly via client device 106) to the camera 130. The camera 130 captures an image of the face of the user 132. The face of the user is partially covered by a facial mask 202. A signature 204 is displayed on the facial mask 202. The user 132 may have signed the signature 204 on the facial mask 202. The user may have written the signature on the facial mask 202. In another example, the facial mask 202 includes a graphic element such as a QR code, a bar code, a graphical design, or an image.

The authentication system 122 identifies a first portion (e.g., facial detection area 206) of the image and a second portion (e.g., signature detection area 208) of the image. The first portion includes the exposed areas of the face of the user 132. For example, the first portion may include an image of the eyes, hair, eyebrows, ears of the user. In other words, these exposed areas are not blocked by the facial mask 202.

The second portion includes the area including a front portion of the facial mask 202. The front portion includes the portion that covers the mouth of the user 132. In another example embodiment, the second portion includes an image of the facial mask 202 and a portion of the string 210 that retains the facial mask 202 to the face of the user. The portion of the string 210 may include a visually distinguishable pattern (e.g., bar code). In another example, each string include a portion of a bar code.

Figure 3:
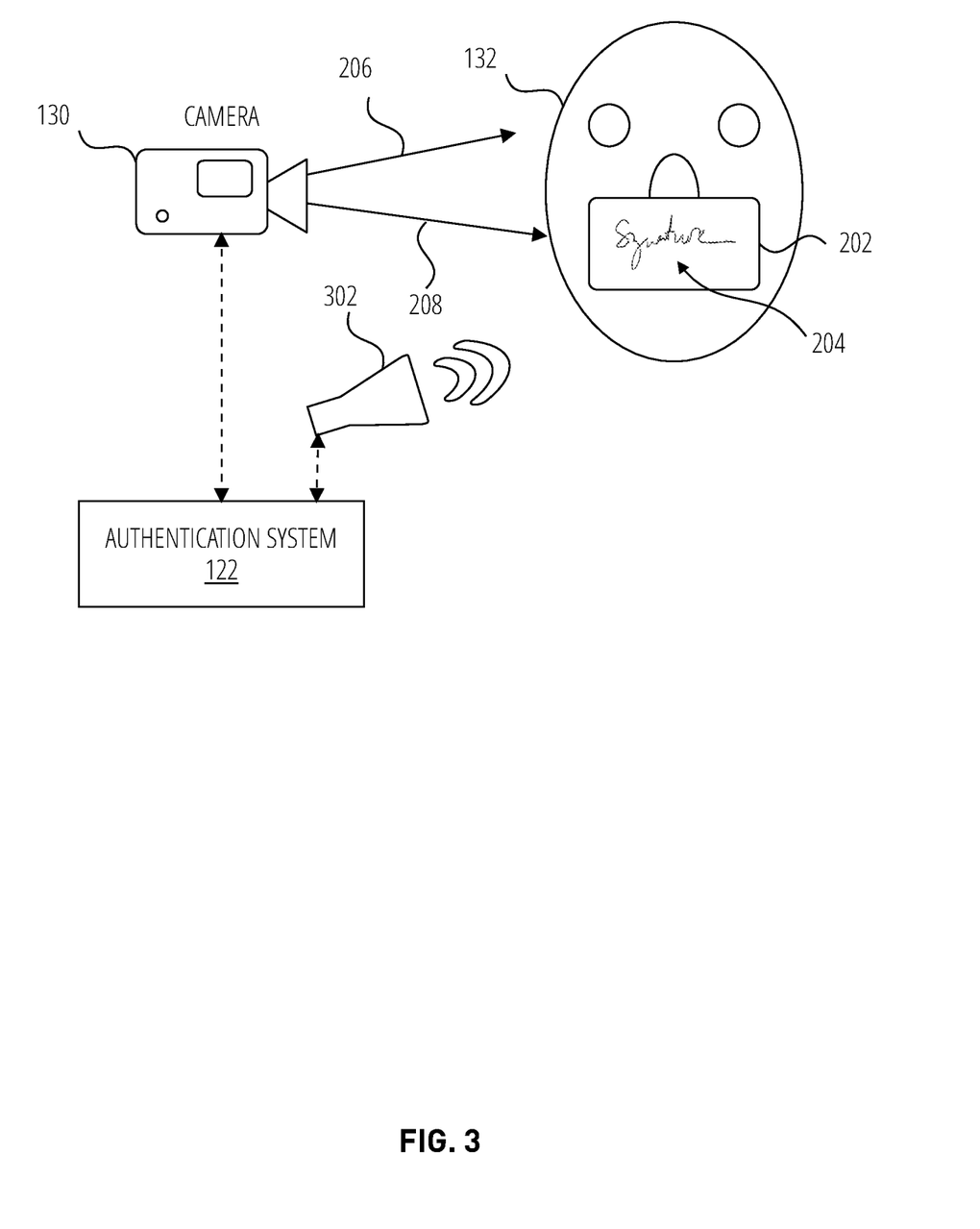
FIG. 3 illustrates another example operation of the authentication system in accordance with one example embodiment.

FIG. 3 illustrates another example operation of the authentication system in accordance with one example embodiment. The authentication system 122 is directly or indirectly connected to a light source (e.g., UV light 302) that is directed to the face of the user 132. The light source may generate a light from a non-human visible spectrum to trigger a display of the signature 204.

Figure 4:
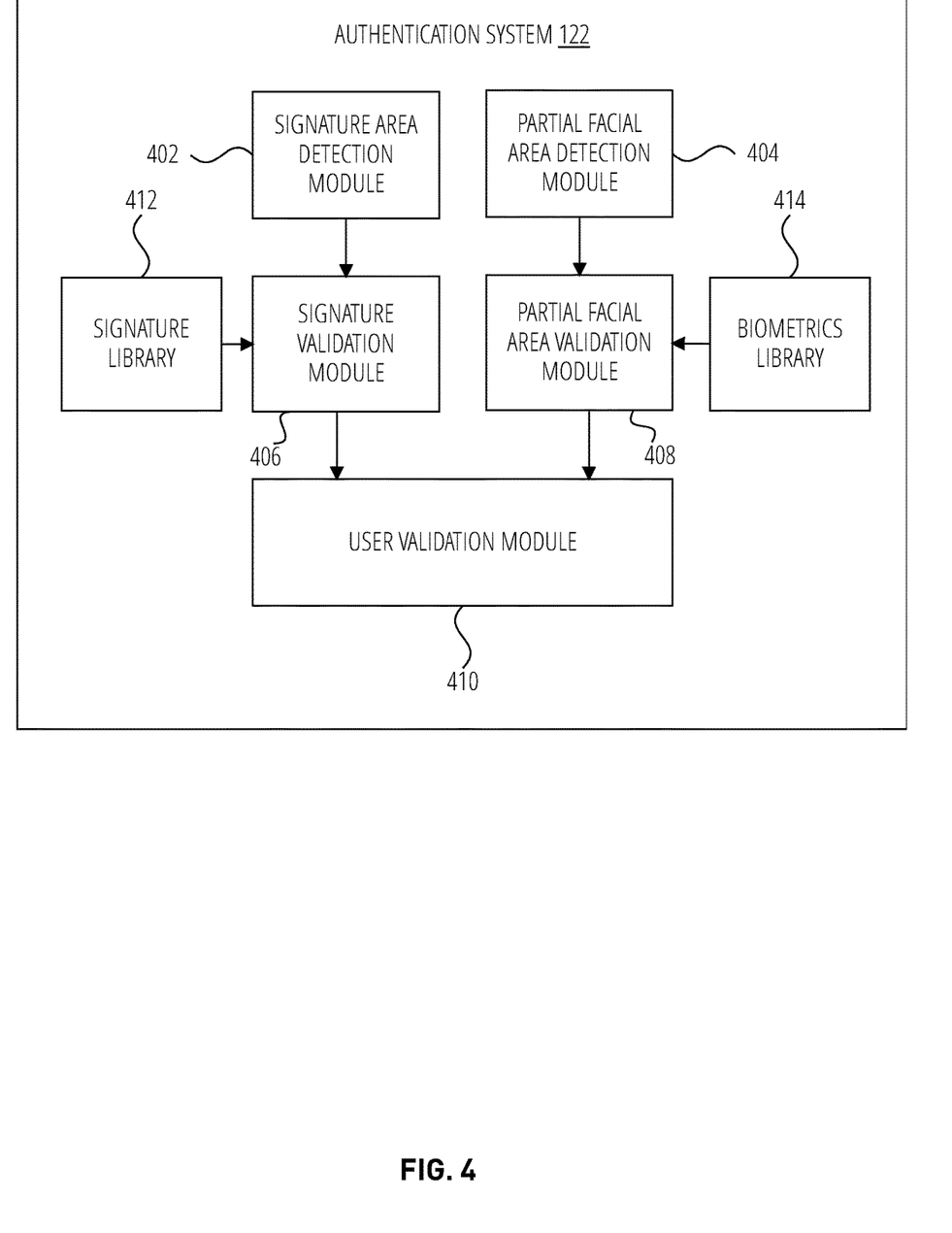
FIG. 4 illustrates an authentication system in accordance with one example embodiment.

FIG. 4 illustrates an authentication system in accordance with one example embodiment. The authentication system 122 comprises a signature area detection module 402, a partial facial area detection module 404, a signature validation module 406, a partial facial area validation module 408, a user validation module 410, a signature library 412, and a biometrics library 414.

The signature area detection module 402 detects the region of the image that includes the facial mask 202 (e.g., signature detection area 208). In one example, the signature area detection module 402 identifies a region in the image that includes the facial mask 202 using an object recognition algorithm. Once the signature area detection module 402 identifies the facial mask 202, the signature area detection module 402 identifies a graphical content on the surface of the facial mask 202: a signature, a user-written content, a QR code, an image.

The signature validation module 406 compares the graphical content from the facial mask 202 with a signature library 412 to identify a first user identification. For example, the signature validation module 406 compares the signature on the facial mask 202 with signatures from the signature library 412 to retrieve a first user identification corresponding to the signature on the facial mask 202. In other example embodiments, the signature library 412 includes a graphical content library that maps graphical elements (e.g., QR code) to users.

In one example embodiment, a user can record his/her signature in the signature library 412 by providing an image of his/her signature (e.g., signature signed on the facial mask 202) to the signature library 412. The signature library 412 associates the provided signature with the user. In other examples, the user may provide other types of visual content (e.g., hand drawn patterns, QR code, bar code, or any uniquely identifiable graphic content or element).

The partial facial area detection module 404 detects the region of the image that includes exposed areas of the face of the user 132. (e.g., facial detection area 206). In one example, the partial facial area detection module 404 identifies a region in the image that includes exposed areas of the face of the user 132, The partial facial area validation module 408 determines biometrics data based on the exposed areas of the face of the user 132. In another example, the partial facial area detection module 404 determines biometrics data based on the exposed areas of the face of the user 132. The partial facial area validation module 408 compares the biometrics data of the user 132 with the biometrics library 414 to retrieve a second user identification corresponding to the biometrics data of the user 132.

The user validation module 410 compares the first user identification with the second user identification to validate an identity of the user 132. For example, if the first user identification and the second user identification are the same, the identity of the user 132 is authenticated and the authentication system 122 communicates the validation to another application to process access. If the first user identification and the second user identification are different, the identity of the user 132 cannot be verified and validated. The authentication system 122 may communicate the un-authentication to another application to deny access.

Figure 5:
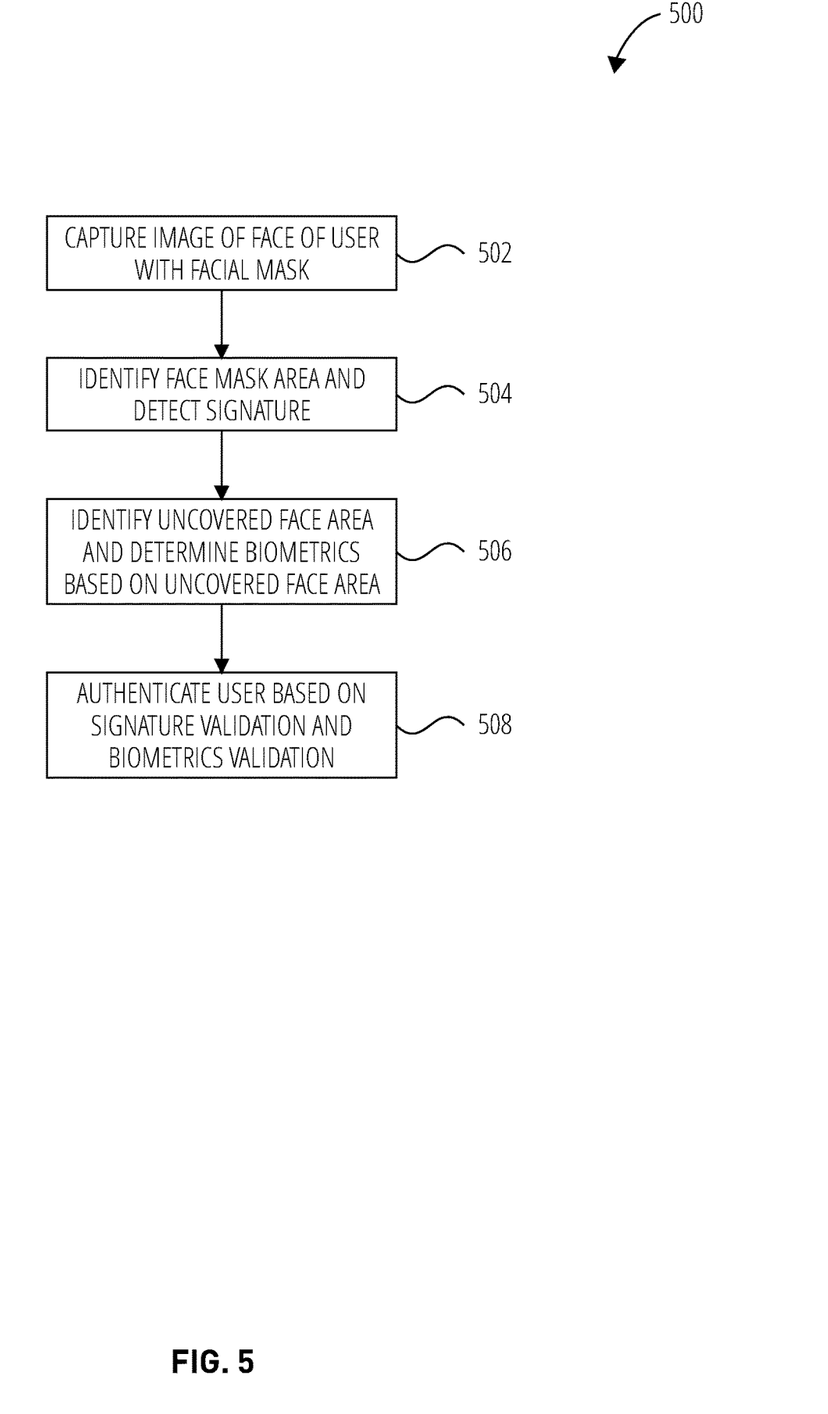
FIG. 5 is a flow diagram illustrating a method for authenticating a user in accordance with one example embodiment.

FIG. 5 is a flow diagram illustrating a method for authenticating a user in accordance with one example embodiment. Operations in the method 500 may be performed by the authentication system 122, using components (e.g., modules, engines) described above with respect to FIG. 4. Accordingly, the method 600 is described by way of example with reference to the authentication system 122. However, it shall be appreciated that at least some of the operations of the method 500 may be deployed on various other hardware configurations or be performed by similar components residing elsewhere. For example, some of the operations may be performed at the client device 106.

At block 502, the camera 130 captures an image of the face of the user wearing a facial mask 202. At block 504, the signature area detection module 402 identifies a face mask area and detects a signature in the face mask area. At block 506, the partial facial area detection module 404 identifies an exposed face area and determines biometrics data based on the exposed face area. At block 508, the user validation module 410 authenticates a user based on the signature validation and biometrics data validation.

Figure 6:
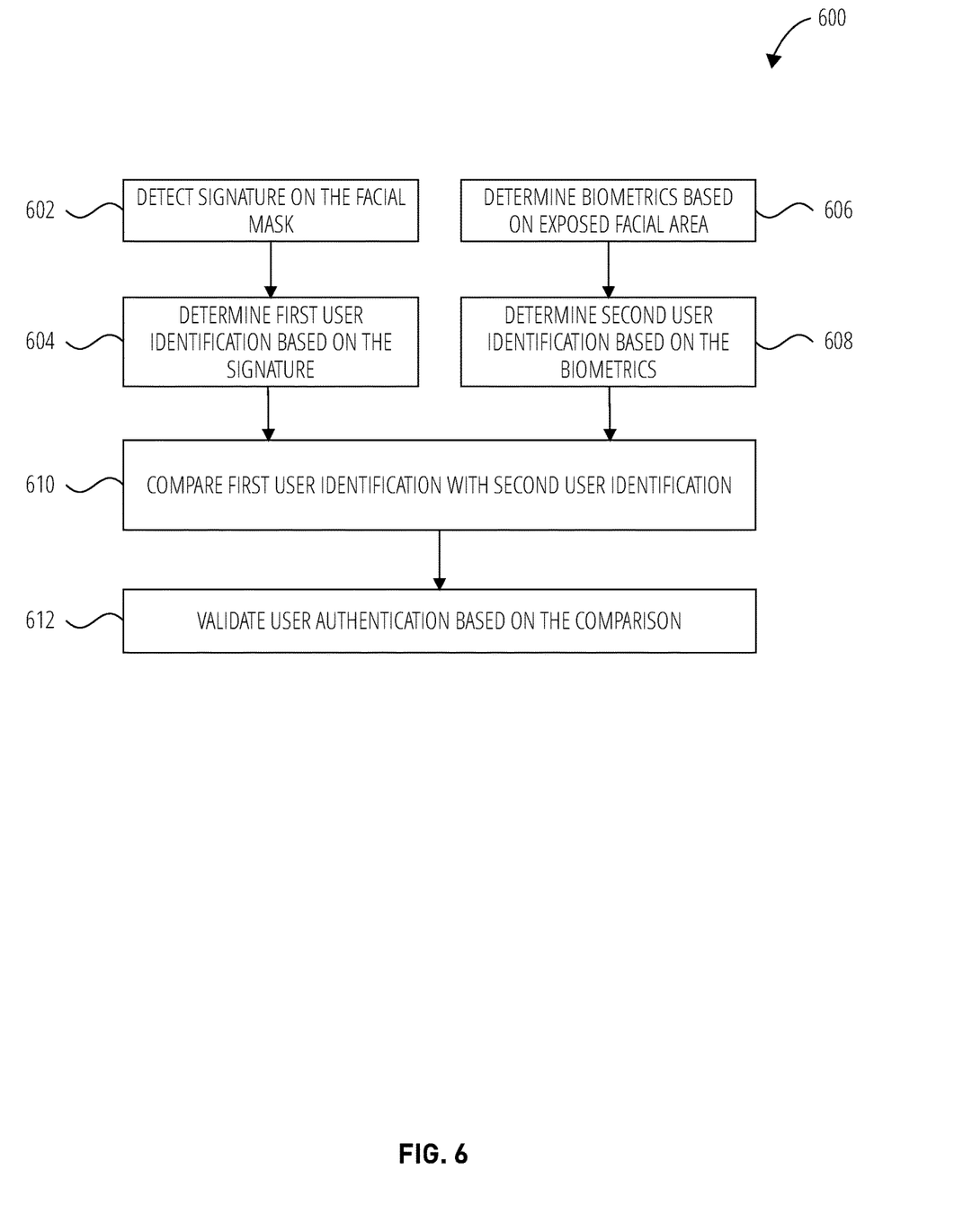
FIG. 6 is a flow diagram illustrating a method for validating a user in accordance with one example embodiment.

FIG. 6 is a flow diagram illustrating a method 600 for validating a user in accordance with one example embodiment. Operations in the method. 600 may be performed by the authentication system 122, using components (e.g., modules, engines) described above with respect to FIG. 4. Accordingly, the method 600 is described by way of example with reference to the authentication system 122. However, it shall be appreciated that at least some of the operations of the method 600 may be deployed on various other hardware configurations or be performed by similar components residing elsewhere. For example, some of the operations may be performed at the client device 106.

At block 602, the signature area detection module 402 detects a signature on the facial mask 202. At block 604, the signature validation module 406 determines a first user identification based on the signature. In one example, the signature validation module 406 determines the first user identification based on a combination of the content displayed on the facial mask 202 and graphical patterns on the string 210 of the facial mask 202.

At block 606, the partial facial area detection module 404 determines biometrics data based on the exposed facial area. At block 608, the partial facial area validation module 408 determines second user identification based on the biometrics. At 610, the user validation module 410 compares the first user identification with the second user identification. At 612, the user validation module 410 validates a user authentication based on the comparison. In one example, the user validation module 410 detects that the first user identification does not match the second user identification, and requests the partial facial area detection module 404 or partial facial area validation module 408 to compute another biometrics data based on other exposed area of the face of the user 132 to generate a third user identification. For example, the partial facial area detection module 404 may calculate biometrics data based on eye brows location instead of eye location. In another example, the user validation module 410 detects that the first user identification does not match the second user identification, and requests that the user further expose addition areas of his face to recompute the second user identification. In another example, the user validation module 410 detects that the first user identification does not match the second user identification, and requests that the user removes the facial mask 202.

Figure 7:
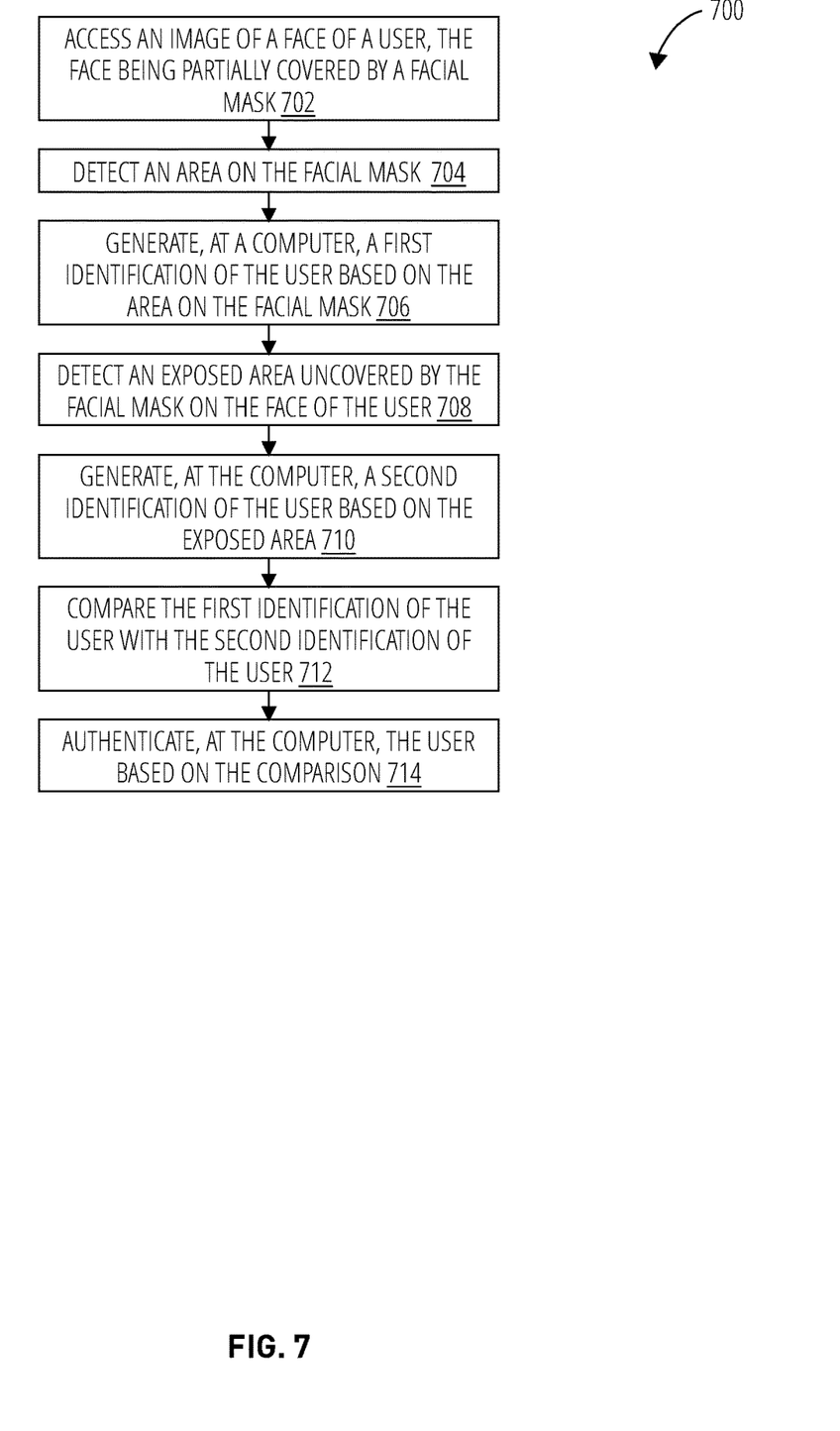
FIG. 7 illustrates a routine in accordance with one embodiment.

FIG. 7 is a flow diagram illustrating a routine 700. In block 702, routine 700 accesses an image of a face of a user, the face being partially covered by a facial mask. In block 704, routine 700 detects an area on the facial mask. In block 706, routine 700 generates, at a computer, a first identification of the user based on the area on the facial mask. In block 708, routine 700 detects an exposed area uncovered by the facial mask on the face of the user. In block 710, routine 700 generates, at the computer, a second identification of the user based on the exposed area. In block 712, routine 700 compares the first identification of the user with the second identification of the user. In block 714, routine 700 authenticates, at the computer, the user based on the comparison.

Figure 8:
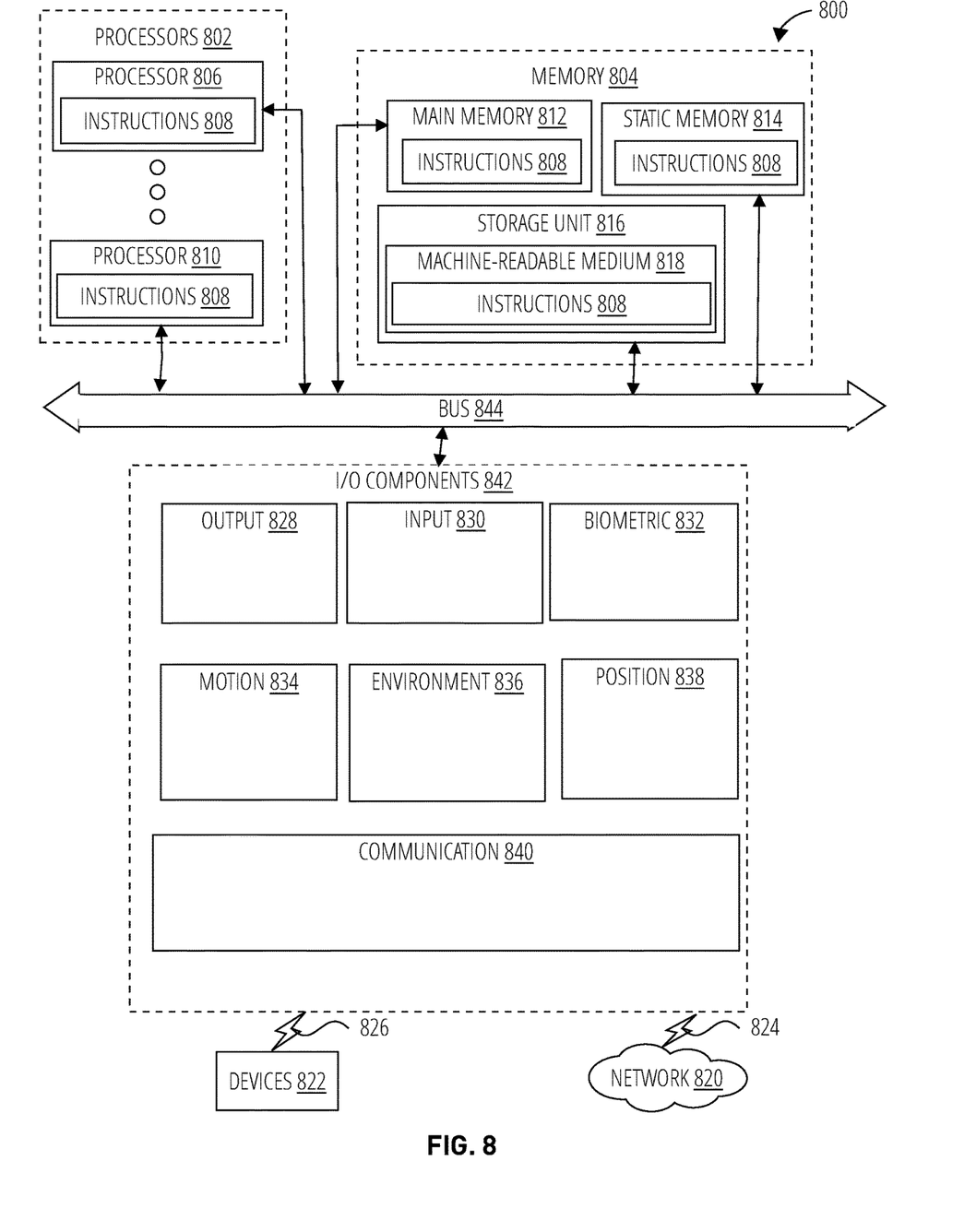
FIG. 8 is a diagrammatic representation of a machine in the form of a computer system within which a set of instructions may be executed for causing the machine to perform any one or more of the methodologies discussed herein, according to an example embodiment.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described.

The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein.

The machine 800 may include processors 802, memory 804, and I/O components 842, which may be configured to communicate with each other via a bus 844, in an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 includes a main memory 812, a static memory 814, and a storage unit 816, both accessible to the processors 802 via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the processor's cache memory), or any suitable combination thereof, during execution thereof by the machine 800.

The I/O components 842 may include a wide variety of components to receive input, provide output, produce output, transmit information, exchange information, capture measurements, and so on. The specific I/O components 842 that are included in a particular machine will depend on the type of machine. For example, portable machines such as mobile phones may include a touch input device or other such input mechanisms, while a headless server machine will likely not include such a touch input device. It will be appreciated that the I/O components 842 may include many other components that are not shown in FIG. 8. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 842 may include biometric components 832, motion components 834, environmental components 836, or position components 838, among a wide array of other components. For example, the biometric components 832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 include acceleration sensor components (e.g., accelerometer), gravitation sensor components, rotation sensor components (e.g., gyroscope), and so forth. The environmental components 836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 further include communication components 840 operable to couple the machine 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

The various memories (e.g., memory 804, main memory 812, static memory 814, and/or memory of the processors 802) and/or storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed embodiments.

The instructions 808 may be transmitted or received over the network 820, using a transmission medium, via a network interface device (e.g., a network interface component included in the communication components 840) and using any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Examples

Example 1 is a computer-implemented method comprising: accessing an image of a face of a user, the face being partially covered by a facial mask; detecting an area on the facial mask; generating, at a computer, a first identification of the user based on the area on the facial mask; detecting an exposed area uncovered by the facial mask on the face of the user; generating, at the computer, a second identification of the user based on the exposed area; comparing the first identification of the user with the second identification of the user; and authenticating, at the computer, the user based on the comparison.

Example 2 includes example 1, wherein the area on the facial mask includes a user signature.

Example 3 includes example 2, wherein generating the first identification of the user further comprises: accessing a user signature library, the user signature library comprising a library of user identifiers and corresponding signature images; comparing the user signature with the user signature library; and determining the first identification of the user based on comparing the written signature with the user signature library.

Example 4 includes example 2, wherein the user signature includes ink that is not visible to a human eye, wherein detecting the area on the facial mask further comprises: illuminating the facial mask with a light source operating at a light spectrum that renders the ink visible to a camera; and capturing an image of the written signature with the camera, wherein generating the first identification of the user is based on the image of the user signature.

Example 5 includes example 1, further comprising: illuminating the facial mask with a light operating at a light spectrum that renders a content of the area visible to a camera; and capturing an image of the content of the area with the camera, wherein generating the first identification of the user is based on the image of the content.

Example 6 includes example 1, wherein the area on the facial mask includes a visual element, wherein generating the first identification of the user further comprises: accessing a user identification library, the user identification library comprising a library of user identifiers and corresponding visual elements; comparing the visual element with the user identification library; and determining the first identification of the user based on comparing the visual element with the user identification library.

Example 7 includes example 1, wherein the area on the facial mask includes a first visual element visible to a camera, and a second visual element visible to the camera only when exposed to a light source operating at a non-human visible light spectrum, wherein generating the first identification of the user further comprises: accessing a user identification library, the user identification library comprising a library of user identifiers and corresponding visual elements; comparing the first visual element and the second visual element with the user identification library; and determining the first identification of the user based on comparing the first visual element and the second visual element with the user identification library.

Example 8 includes example 1, wherein detecting the exposed area uncovered by the facial mask on the face of the user further comprises: determining biometrics data based on the exposed area, wherein generating the second identification of the user based on the exposed area further comprises: comparing the determined biometrics data with biometrics data from a biometrics library, the biometric library comprising a library of biometrics data and corresponding user identifiers; and determining the second identification of the user based on comparing the determined biometrics data with the biometrics library.

Example 9 includes example 1, further comprising: determining that the first identification of the user and the second identification indicate the same user; and in response to the first and second identification being the same, validating an identity of the user.

Example 10 includes example 1, further comprising: determining that the first identification of the user is the different from the second identification of the user; and in response to the first identification being different from the second identification, detecting a second exposed area uncovered by the facial mask on the face of the user; generating, at the computer, a third identification of the user based on the second exposed area; determining that the first identification and the third identification indicate the same user; and in response to the first and third identification being the same, validating an identity of the user.

What is claimed is:

1. A computer-implemented method comprising:
    accessing an image of a face of a user, the face being partially covered by a facial mask, wherein the facial mask comprises a first visual element visible to a camera, and a second visual element visible to the camera only when exposed to a light source operating at a non-human visible light spectrum;
    detecting a content in an area on the facial mask;
    generating, at a computer, a first identification of the user based on the content;
    detecting a first exposed area uncovered by the facial mask on the face of the user;
    generating, at the computer, a second identification of the user based on the first exposed area;
    determining that the first identification of the user does not match with the second identification of the user;
    in response to determining that the first identification of the user does not match with the second identification of the user, generating a request to the user to uncover a portion of the facial mask from the face of the user to expose a second exposed area of the face of the user; and
    validating an identity of the user based on the second exposed area.

2. The computer-implemented method of claim 1, further comprising:
    generating, at the computer, a third identification of the user based on the second exposed area;
    comparing the first identification of the user with the third identification of the user; and
    determining that the first identification of the user matches the third identification of the user based on the comparing.

3. The computer-implemented method of claim 1, wherein the facial mask comprises a user signature signed with ink that is not visible to a human eye,
    wherein the method further comprises:
    illuminating the facial mask with a light source operating at a light spectrum that renders the ink visible to a camera of the computer;
    capturing an image of the user signature illuminated by the light source; and
    generating, at the computer, the first identification of the user based on the image of the user signature.

4. The computer-implemented method of claim 3, wherein the user signature is located in a signature detection area on the facial mask.

5. The computer-implemented method of claim 3, wherein generating the first identification of the user further comprises:
    accessing a user signature library, the user signature library comprising a library of user identifiers and corresponding signature images;
    comparing the user signature with the user signature library; and
    determining the first identification of the user based on comparing the user signature with the user signature library.

6. The computer-implemented method of claim 3, wherein the light source renders a content, printed with the ink on the facial mask, visible to the camera, wherein generating the first identification of the user is based on an image of the content.

7. The computer-implemented method of claim 4, further comprising:
    identifying the signature detection area on the facial mask.

8. The computer-implemented method of claim 1, wherein the facial mask includes a visual element,
    wherein generating the first identification of the user further comprises:
    accessing a user identification library, the user identification library comprising a library of user identifiers and corresponding visual elements;
    comparing the visual element with the user identification library; and
    determining the first identification of the user based on comparing the visual element with the user identification library.

9. The computer-implemented method of claim 1,
    wherein generating the first identification of the user further comprises:
    accessing a user identification library, the user identification library comprising a library of user identifiers and corresponding visual elements;
    comparing the first visual element and the second visual element with the user identification library; and
    determining the first identification of the user based on comparing the first visual element and the second visual element with the user identification library.

10. The computer-implemented method of claim 1, wherein detecting the exposed area uncovered by the facial mask on the face of the user further comprises:
    determining biometrics data based on the exposed area,
    wherein generating the second identification of the user based on the exposed area further comprises:
    comparing the determined biometrics data with biometrics data from a biometrics library, the biometric library comprising a library of biometrics data and corresponding user identifiers; and
    determining the second identification of the user based on comparing the determined biometrics data with the biometrics library.

11. A computing apparatus comprising:
    a processor; and
    a memory storing instructions that, when executed by the processor, configure the computing apparatus to perform operations comprising:
    accessing an image of a face of a user, the face being partially covered by a facial mask, wherein the facial mask comprises a first visual element visible to a camera, and a second visual element visible to the camera only when exposed to a light source operating at a non-human visible light spectrum;

detecting a content in an area on the facial mask;

generating a first identification of the user based on the content;

detecting a first exposed area uncovered by the facial mask on the face of the user;

generating a second identification of the user based on the first exposed area;

determining that the first identification of the user does not match with the second identification of the user;

in response to determining that the first identification of the user does not match with the second identification of the user, generating a request to the user to uncover a portion of the facial mask from the face of the user to expose a second exposed area of the face of the user; and validating an identity of the user based on the second exposed area.

12. The computing apparatus of claim 11, wherein the operations further comprise:

generating a third identification of the user based on the second exposed area;

comparing the first identification of the user with the third identification of the user; and determining that the first identification of the user matches the third identification of the user based on the comparing.

13. The computing apparatus of claim 11, wherein the facial mask comprises a user signature signed with ink that is not visible to a human eye, wherein the operations further comprise:

illuminating the facial mask with a light source operating at a light spectrum that renders the ink visible to a camera of the computer;

capturing an image of the user signature illuminated by the light source; and generating, at the computer, the first identification of the user based on the image of the user signature.

14. The computing apparatus of claim 13, wherein the user signature is located in a signature detection area on the facial mask.

15. The computing apparatus of claim 13, wherein generating the first identification of the user further comprises:

accessing a user signature library, the user signature library comprising a library of user identifiers and corresponding signature images;

comparing the user signature with the user signature library; and determining the first identification of the user based on comparing the user signature with the user signature library.

16. The computing apparatus of claim 13, wherein the light source renders a content, printed with the ink on the facial mask, visible to the camera, wherein generating the first identification of the user is based on an image of the content.

17. The computing apparatus of claim 14, wherein the operations further comprise:

identifying the signature detection area on the facial mask.

18. The computing apparatus of claim 11, wherein the facial mask includes a visual element, wherein generating the first identification of the user further comprises:

accessing a user identification library, the user identification library comprising a library of user identifiers and corresponding visual elements;

comparing the visual element with the user identification library; and determining the first identification of the user based on comparing the visual element with the user identification library.

19. The computing apparatus of claim 11, wherein the facial mask includes a first visual element visible to a camera, and a second visual element visible to the camera only when exposed to a light source operating at a non-human visible light spectrum, wherein generating the first identification of the user further comprises:

accessing a user identification library, the user identification library comprising a library of user identifiers and corresponding visual elements;

comparing the first visual element and the second visual element with the user identification library; and determining the first identification of the user based on comparing the first visual element and the second visual element with the user identification library.

20. A non-transitory computer-readable storage medium, the computer-readable storage medium including instructions that when executed by a computer, cause the computer to:

accessing an image of a face of a user, the face being partially covered by a facial mask, wherein the facial mask comprises a first visual element visible to a camera, and a second visual element visible to the camera only when exposed to a light source operating at a non-human visible light spectrum;

detecting a content in an area on the facial mask;

generating a first identification of the user based on the content;

detecting a first exposed area uncovered by the facial mask on the face of the user;

generating a second identification of the user based on the first exposed area;

determining that the first identification of the user does not match with the second identification of the user;

in response to determining that the first identification of the user does not match with the second identification of the user, generating a request to the user to uncover a portion of the facial mask from the face of the user to expose a second exposed area of the face of the user; and validating an identity of the user based on the second exposed area.

* * * * *